United States Patent
Elangovan et al.

(10) Patent No.: US 11,527,117 B2
(45) Date of Patent: Dec. 13, 2022

(54) INTERFERENCE AVOIDING DISTANCE MEASUREMENT

(71) Applicant: FORD GLOBAL TECHNOLOGIES, LLC, Dearborn, MI (US)

(72) Inventors: Vivekanandh Elangovan, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 17/145,774

(22) Filed: Jan. 11, 2021

(65) Prior Publication Data

US 2022/0222988 A1 Jul. 14, 2022

(51) Int. Cl.
*G07C 9/00* (2020.01)
*H04B 15/00* (2006.01)

(52) U.S. Cl.
CPC ......... *G07C 9/00309* (2013.01); *H04B 15/00* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 8,306,132 B2 * | 11/2012 | Aoki | H04B 3/46 375/326 |
| 8,805,285 B2 | 8/2014 | Thota et al. | |
| 8,874,034 B2 | 10/2014 | Walley et al. | |
| 2005/0129139 A1 * | 6/2005 | Jones | H04B 1/69 375/295 |
| 2010/0266004 A1 * | 10/2010 | Aoki | H04B 3/46 375/226 |
| 2019/0386743 A1 * | 12/2019 | Yin | H04B 10/0795 |

* cited by examiner

*Primary Examiner* — Carlos Garcia
(74) *Attorney, Agent, or Firm* — Frank L. Lollo; Brooks Kushman P.C.

(57) ABSTRACT

Interference-avoiding distance measurement is provided. A controller of a first wireless device is configured for wireless communication over a first transmission protocol with a second wireless device. One or more occupied channels of a second transmission protocol are identified, the first and second transmission protocols having overlapping frequency spectrums. A channel plan is constructed according to the occupied channels, the channel plan using a set of channels of the first transmission protocol that do not overlap in frequency with the one or more occupied channels of the second transmission protocol. Phase-based ranging is performed using data scanned via the channel plan. A distance measurement is indicated based on the phase-based ranging.

20 Claims, 4 Drawing Sheets

INTERFERENCE AVOIDING DISTANCE MEASUREMENT

TECHNICAL FIELD

Aspects of the disclosure generally relate to interference-avoiding distance measurement, and more specifically to time-of-flight (ToF) distance measurement between wireless devices while avoiding channels suffering interference from another protocol.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry and passive start (PEPS) key fobs operate without a customer interaction with the fob buttons to provide a response to a challenge pulse train sent by the vehicle, where if a proper response is received by the vehicle then the door may be unlocked by a user grasping the door handle. Phone-as-a-Key (PaaK) systems allow users to utilize their phones to unlock a vehicle without requiring a key fob device. These systems may operate similar to a key fob, but with communication with the vehicle over BLUETOOTH Low Energy (BLE) or Ultra-Wide Band (UWB) protocols.

SUMMARY

In one or more illustrative examples, a system for interference-avoiding distance measurement is provided. The system includes a controller of a first wireless device that is configured for wireless communication over a first transmission protocol with a second wireless device. The controller is programmed to identify one or more occupied channels of a second transmission protocol, the first and second transmission protocols having overlapping frequency spectrums; construct a channel plan using a set of channels of the first transmission protocol that do not overlap in frequency with the one or more occupied channels of the second transmission protocol; perform phase-based ranging using data scanned via the channel plan; and indicate a distance measurement based on the phase-based ranging.

In one or more illustrative examples, a method for interference-avoiding distance measurement is provided. A controller of a first wireless device is configured for wireless communication over a first transmission protocol with a second wireless device. One or more occupied channels of a second transmission protocol are identified, the first and second transmission protocols having overlapping frequency spectrums. A channel plan is constructed according to the occupied channels, the channel plan using a set of channels of the first transmission protocol that do not overlap in frequency with the one or more occupied channels of the second transmission protocol. Phase-based ranging is performed using data scanned via the channel plan. A distance measurement is indicated based on the phase-based ranging.

In one or more illustrative examples, a non-transitory medium includes instructions for interference-avoiding distance measurement that, when executed by a processor of a controller, cause the controller to identify, by a controller of a first wireless device configured for wireless communication over a first transmission protocol with a second wireless device, one or more occupied channels of a second transmission protocol, the first and second transmission protocols having overlapping frequency spectrums; construct a channel plan using a set of channels of the first transmission protocol that do not overlap in frequency with the one or more occupied channels of the second transmission protocol; perform phase-based ranging using data scanned via the channel plan; and indicate a distance measurement based on the phase-based ranging.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Distance measurement based on BLE phase measurement may be used to support various features such as relay attack prevention for PaaK systems. An example BLE phase measurement method may use 1 MHz channels to measure signal phase between two BLE devices. Since just one channel is generally insufficient information to provide an accurate distance calculation, many or even all available BLE channels within the BLE spectrum may be used to perform this calculation. Continuing with the example of 1 MHz channels, as the BLE spectrum is 80 MHz wide then 80 channels may potentially be available for measurement.

In some scenarios, to improve accuracy, additional channels may be used for measuring the distance by repeated use of a portion of the spectrum. For instance, to simulate the accuracy of having 100 channels, the entire 80 channel bandwidth of the BLE spectrum may be used and additionally the measurement may be repeated over the spectrum again using 20 of the channels. Or as a different example, if 100 channel measurement accuracy is desired, a subset of the channels may be used (e.g., the first 70 channels in the BLE spectrum) and then use 30 channels from the same BLE spectrum (e.g., the first 30 channels may be used a second time).

Although using more channels for the BLE phase measurement increases the accuracy of measurement, the usage of the entire BLE bandwidth can cause interference issues with Wi-Fi. As Wi-Fi can operate in the same spectrum as BLE, when there is a strong Wi-Fi signal, the BLE signals may become distorted. Thus, in such a situation it is difficult for the receiver to measure the phase of the BLE channel as the Wi-Fi signal is stronger and introduces distortion to the signal. Since Wi-Fi has a broader bandwidth than BLE (e.g., 20 MHz and 40 MHz as currently implemented for Wi-Fi versus 2 MHz channels for BLE), the number of BLE channels that are distorted is higher, which results in poor BLE phase accuracy during distance measurement.

To preserve the accuracy provided by the BLE phase measurement, it may be desirable to avoid interference caused by Wi-Fi signals. Accordingly, while performing the BLE phase measurement the channels being used by Wi-Fi can be skipped, and the distance measurement can be performed using the undistorted channels. For instance, if Wi-Fi is operating at channel 1 (which is 22 MHz wide), then the BLE phase measurement may use BLE channels 23 to 80 for the distance measurement. Further aspects of the disclosure are discussed in detail herein.

Figure 1:
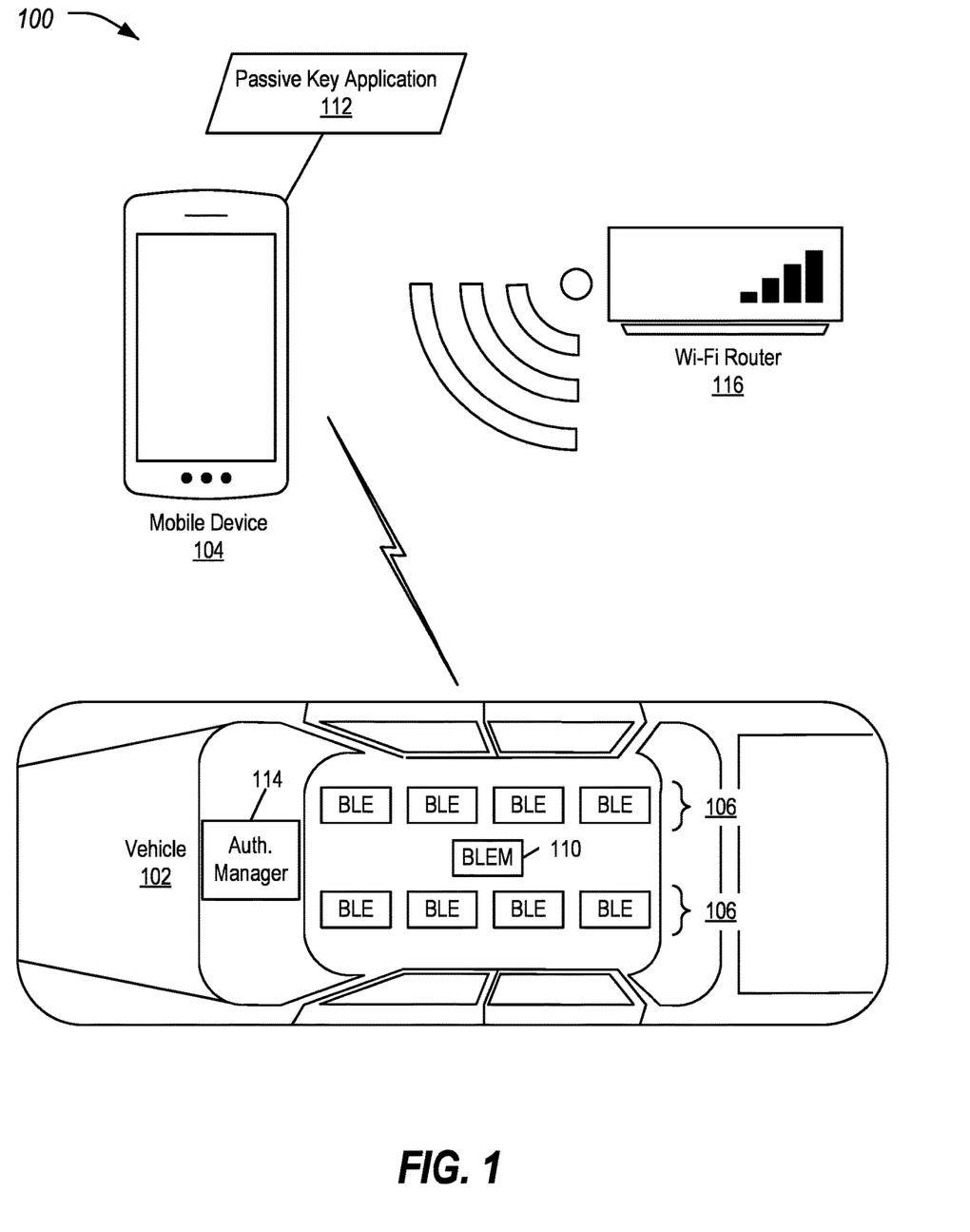
FIG. 1 illustrates an example system including a mobile device configured for communication with a vehicle for performing channel-avoiding BLE phase measurement.

FIG. 1 illustrates an example system including a mobile device 104 configured for communication with a vehicle 102 for performing channel-avoiding BLE phase measurement. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a plug-in hybrid electrical vehicle (PHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The mobile device 104 may be any of various types of portable computing device, such a cellular phone, tablet computer, smart watch, laptop computer, portable music player, or other devices having processing and communications capabilities. The mobile device 104 may include one or more processors configured to execute computer instructions, and a storage medium on which the computer-executable instructions and/or data may be maintained.

The mobile device 104 may further include various wireless transceivers, such as a BLUETOOTH or BLE transceiver or UWB transceiver. BLUETOOTH and BLE technology both operate in the spectrum range of 2.4 to 2.4835 GHz. BLUETOOTH uses a layout of seventy-nine 1-MHz channels, while BLE uses has forty 2-MHz channels. UWB operates in the 6-8 GHz band.

The vehicle 102 may include an array of BLE transceivers 106 configured to facilitate communication between the mobile device 104 and the vehicle 102. For instance, each BLE transceiver 106 may be connected to one or more antennas to form an array that may be used to triangulate or otherwise detect the location of the mobile device 104. The BLE transceivers 106 may be controlled by a BLE module (BLEM) 108 including a memory and a processor programmed to send and receive messaging between the mobile device 104 and the vehicle 102, e.g., to provide for the performance of challenge-response sequences and/or to receive commands from the vehicle 102. In an example, a key fob may connect to the closest-detected BLE transceiver 106 to communicate with the BLEM 108 of the vehicle 102. As shown the vehicle 102 includes eight BLE transceivers 106, but it should be noted that implementations may include more or fewer transceivers and/or antennas.

The mobile device 104 may also include a display configured to provide a user interface to a user. In some examples, the display may be touch-sensitive, and may be further configured to receive input from the user. Additionally, a passive key application 112 may include instructions that, when executed by the one or more processors of the mobile device 104, cause the mobile device 104 to perform operations to facilitate access to the vehicle 102. In an example, the passive key application 112 may cause the mobile device 104 to display a user interface to the display including controls similar to those of a key fob, e.g., lock, unlock, start, etc. In another example, the passive key application 112 may cause the mobile device 104 to interact as a passive entry device with the vehicle 102, providing presence information to the BLEM 110 that allows the vehicle 102 to detect that an authorized user of the vehicle 102 is nearby. By executing the passive key application 112 to control communication of the mobile device 104 with the BLEM 110 of the vehicle 102, the mobile device 104 may be used to unlock, start, or otherwise access the vehicle 102.

The passive key application 112 may allow for the authentication of the mobile device 104 to the vehicle 102 using an authentication manager 114 of the vehicle 102. The authentication manager 114 may be a controller of the vehicle 102 that is in communication with the BLEM 110, as well as with other components of the vehicle 102, such as door locks or the vehicle ignition interlock. The authentication of the mobile device 104 to vehicles 102 may utilize a PaaK feature implementation, ensuring a secure connection between the user mobile device 104 and a vehicle connectivity module (such as the BLEM 110), whereby the user position can be localized utilizing the BLE transceiver 106 antennas. For instance, the authentication manager 114 may confirm the location of the mobile device 104 as local to the vehicle 102, and/or may perform relay attack prevention according to ToF and/or the location determination of the mobile device 104.

A Wi-Fi router 116 may operate in the vicinity of the vehicle 102 and mobile device 104. Wi-Fi is a family of wireless network protocols, based on the IEEE 802.11 family of standards commonly used for local area networks. Wi-Fi most commonly uses the 2.4 GHz and 5 GHz radio bands, which are divided into multiple channels. Channels can be shared between networks but only one transmitter can locally transmit on a channel at any moment in time. As Wi-Fi and BLE both use the 2.4 GHz spectrum, interference between the protocols is possible.

Figure 2:
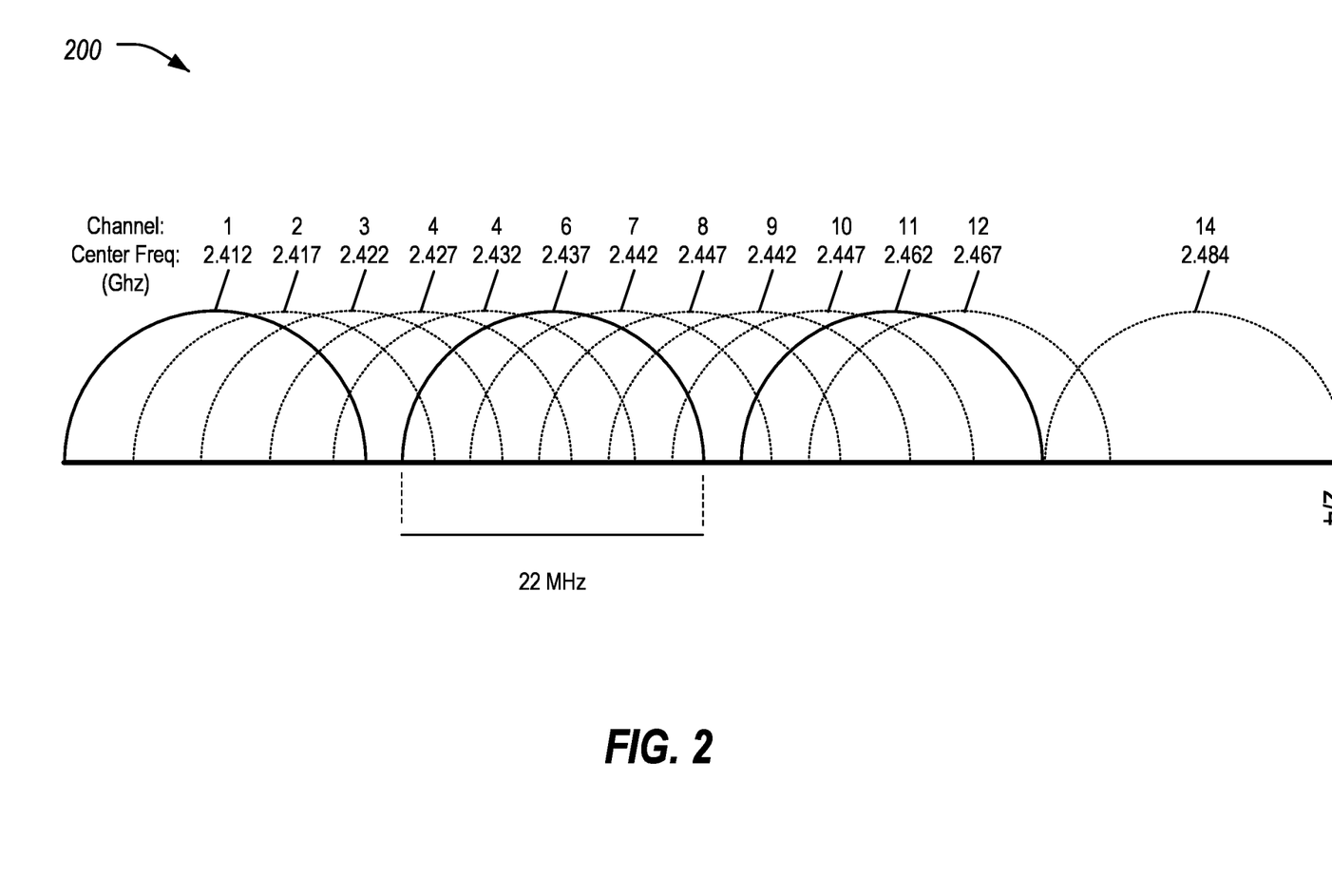
FIG. 2 illustrates an example diagram of a portion of Wi-Fi and BLE channels.

FIG. 2 illustrates an example diagram 200 of a portion of Wi-Fi and BLE channels. As shown, the Wi-Fi channels for the 2.4 GHz spectrum are 22 MHz wide and there are a total of 14 channels, but there are only 3 Wi-Fi channels which are non-overlapping with other Wi-Fi channels (channels 1, 6, and 11). These three non-overlapping channels are the preferred channels for commercial Wi-Fi applications.

As noted above, to preserve accuracy provided by BLE phase measurement, it may be desirable to avoid interference caused by Wi-Fi signals. While performing the BLE time of flight measurement those channels which are used by the Wi-Fi signal can be skipped when performing the distance measurement. For instance, if Wi-Fi is operating at channel 1 which is 22 MHz wide, then the BLE phase measurement can use the BLE channels 23 to 80 for the distance measurement.

When the BLE phase measurement is implemented on the BLEM 110 of the vehicle 102, occupied Wi-Fi channels can be avoided during measurement. As one possibility, an approach may provide an indication of the Wi-Fi channels with higher power level (e.g., by measuring signal strength of the Wi-Fi channel) which are located within the vicinity to the BLEM 110 so that the BLE phase measurement can skip these high power Wi-Fi channels while performing the distance measurement. This approach requires Wi-Fi signal tracing capability and reporting the Wi-Fi signal tracing details back to the BLEM 110 in advance, so that the BLEM 110 can avoid the Wi-Fi channels (based on tracing details) for distance measurement. This approach may provide better reliability of phase measurement but requires a Wi-Fi chipset to sniff for the occupied Wi-Fi channels and report the Wi-Fi sniffing details back to the BLEM 110 before starting any phase measurement operation.

Another approach may be to perform phase-based ranging on all the channels (i.e., the entire 80 MHz spectrum) and then review the signal information to determine if In-phase (I) and Quadrature (Q) data can be extracted from the BLE signal. This I and Q data may generally be used to calculate the distance measurement. If the Wi-Fi signal is strong in a certain channel, however, the I and Q data will be of no use in the distance measurement. This lack of good data may accordingly provide the BLEM 110 with an indication of which channels are unusable. These unusable I and Q data channels may be correlated to Wi-Fi channels. By correlating the unusable I and Q data channels, the BLEM 110 can avoid using occupied Wi-Fi channels during that particular measurement to be able to achieve a high accuracy in the distance measurement.

As a more specific situation, the vehicle 102 may be parked next to a coffee shop which has a public Wi-Fi, such that the Wi-Fi router 116 is positioned close to the vehicle 102. A user of the vehicle 102 is approaching towards the vehicle 102 with a mobile device 104, causing the BLEM 110 to perform a BLE phase measurement across the 80 MHz of BLE spectrum. When the data is analyzed, the BLEM 110 determines that the I and Q data from channels 1 to 22 are of no use as they are distorted. This leads the BLEM 110 to determine that there is a Wi-Fi router close to the vehicle 102 which operates on Wi-Fi channel 1 (which is 22 MHz wide as noted above). For a next measurement, the BLEM 110 may avoid use of channels 1 to 22 and may instead start the measurement from channel 23 up to channel 80. If more measurements are required to ensure adequate accuracy, additional phase measurement may again be performed using the undistorted channels from channel 23 to whatever channel is required for attaining the accuracy. For instance, if the BLEM 110 targets 80 channels to attain adequate accuracy and it is determined that Wi-Fi channel 1 is present due to interference with the initial measurement, the BLEM 110 may perform BLE phase measurement using channels 23 through 80, which is a total of 58 channels, and may again start at channel 23 measure consecutively upward until channel 44 to add another 22 channels of measurement to reach the target of 80 channels to provide us the specified accuracy.

It should be noted that such an approach may be repeated for new sessions, as the Wi-Fi channel occupancy may change between various locations, and sometimes within the same location, according to normal operation of the Wi-Fi router 116.

Figure 3:
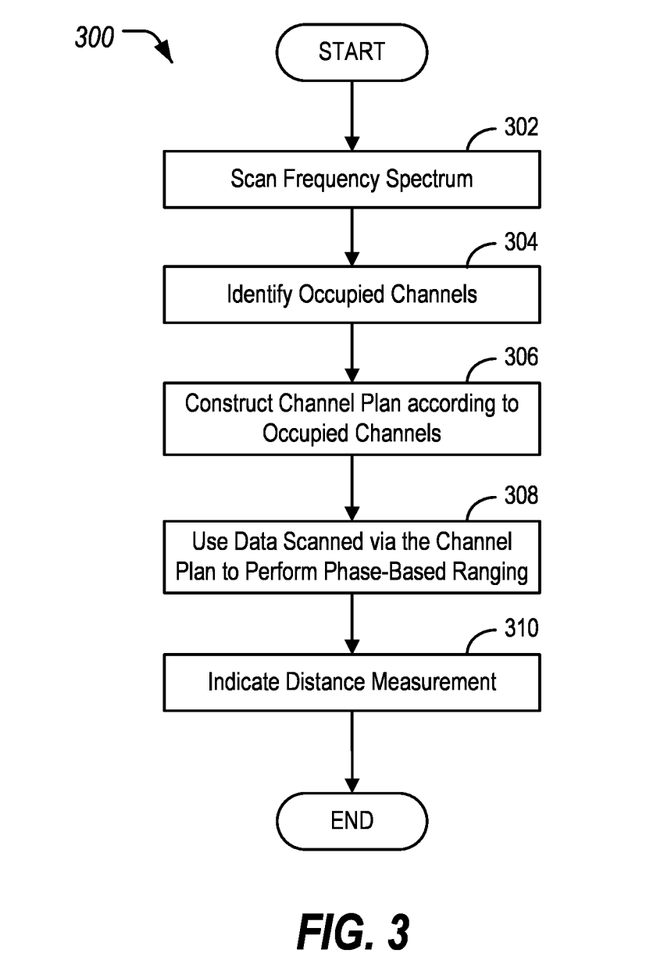
FIG. 3 illustrates an example process for performing channel-avoiding BLE phase measurement according to a target channel count.

FIG. 3 illustrates an example process 300 for performing BLE phase measurement according to a target channel count. In an example the process 300 may be performed by a BLEM 110 of the vehicle 102, in communication with a mobile device 104 in an environment including the Wi-Fi router 116.

At operation 302, the BLEM 110 scans the BLE frequency spectrum for Wi-Fi interference. In an example, the BLEM 110 may perform an initial scan of the BLE channels using the antenna array of BLE transceivers 106.

At operation 304, the BLEM 110 identifies occupied Wi-Fi channels. Based on which BLE channels show interference, the BLEM 110 can infer which Wi-Fi channels are likely occupied. For instance, if interference is noted some or all of BLE channels 1-22, then the BLEM 110 may infer presence of channel 1 usage by the Wi-Fi router 116. In another example, if interference is noted on BLE channels that overlap channel 6 then the BLEM 110 may infer presence of channel 6 usage. In yet a further example, the BLEM 110 may integrate Wi-Fi functionality or be in communication with a Wi-Fi transceiver component of the vehicle 102 to directly identify which Wi-Fi channels may be in use.

At operation 306, the BLEM 110 constructs a channel plan according to the occupied channels. For instance, the BLEM 110 may indicate an accuracy preference as a predefined quantity of BLE channels used to perform phase measurements for the mobile device 104. The quantity of measurements may be allocated to the unoccupied BLE channels in various approaches. For instance, if the predefined quantity of BLE channels is less than or equal to the number of unoccupied BLE channels, then each of the BLE channels may be used once or less than once to reach the predefined quantity of BLE channels.

However, if the predefined quantity of BLE channels exceeds the number of unoccupied BLE channels, then one or more of the unoccupied BLE channels may be used more than once to complete the measurements over the predefined quantity of BLE channels. Within these parameters, an example channel plan may scan across the unoccupied BLE channels in order and then restart scanning across the unoccupied BLE channels until the predefined quantity of BLE channels is reached. In some examples, if the predefined quantity of BLE channels is large enough, then three or even more passes across the unoccupied BLE channels may be performed. It should also be noted that while the channels may be scanned across sequentially, in other examples the unoccupied BLE channels may be sampled randomly, every second or third channel, concurrently, or in any other arbitrary order or approach.

At operation 308, the BLEM 110 captures data using the channel plan to perform the phase-based ranging. For instance, a pulse or other signal may be sent by the BLEM 110 via the antenna array of BLE transceivers 106 and returned to the BLEM 110 from the mobile device 104. In-phase (I) and Quadrature (Q) data may then be extracted from the BLE signals received back to the BLEM 110 for each of the scanned channels. A rough distance may be determined by the BLEM 110 using ToF of the transaction. Moreover, by using the I and Q data over different frequencies, greater accuracy in the distance measurement may be provided. For instance, a linear relationship may exist between received phase angle offset and radio frequency (RF) signal frequency, and the distance between the vehicle 102 and the mobile device 104 may be proportional to the slope of the phase/frequency curve. Therefore, by using the various channel frequencies specified by the channel plan and observing the received phase offset-angles of the RF signal for each of those frequencies, the distance between the vehicle 102 and the mobile device 10 may be calculated.

At operation 310, the BLEM 110 indicates a distance measurement of the vehicle 102 to the mobile device 104. For instance, this distance measurement may be used by the authentication manager 114 to confirm with indicated accuracy that the mobile device 104 is within a close enough distance (e.g., a few meters) to allow for unlocking of the vehicle 102. After operation 310, the process 300 ends.

It should be noted that while many examples herein relate to use of BLE and Wi-Fi, the described approaches are not limited to such protocols. Moreover, while many examples herein relate to communication between vehicles 102 mobile devices 104, the described approaches are also not limited to such environments. More generally, the disclosed approaches may be used in instances where distance measurements are contemplated over channels of a first transmission protocol that overlap in frequency with one or more occupied channels of a second transmission protocol. In such cases, to maintain accuracy in distance measurement between the wireless devices, and while avoiding the channels having interference, the interfering channels may be identified, and repeated use of the remaining channels may be performed to measure distance.

For instance, a controller of a first wireless device may be configured for wireless communication over a first transmission protocol with a second wireless device. The controller may identify one or more occupied channels of a second transmission protocol, where the first and second transmission protocols having overlapping frequency spectrum. The controller may construct a channel plan according to the occupied channels, where the channel plan uses a set of channels of the first transmission protocol that do not overlap in frequency with the one or more occupied channels of the second transmission protocol. The controller may perform phase-based ranging using the data scanned via the channel plan. The controller may also indicate a distance measurement based on the phase-based ranging.

Figure 4:
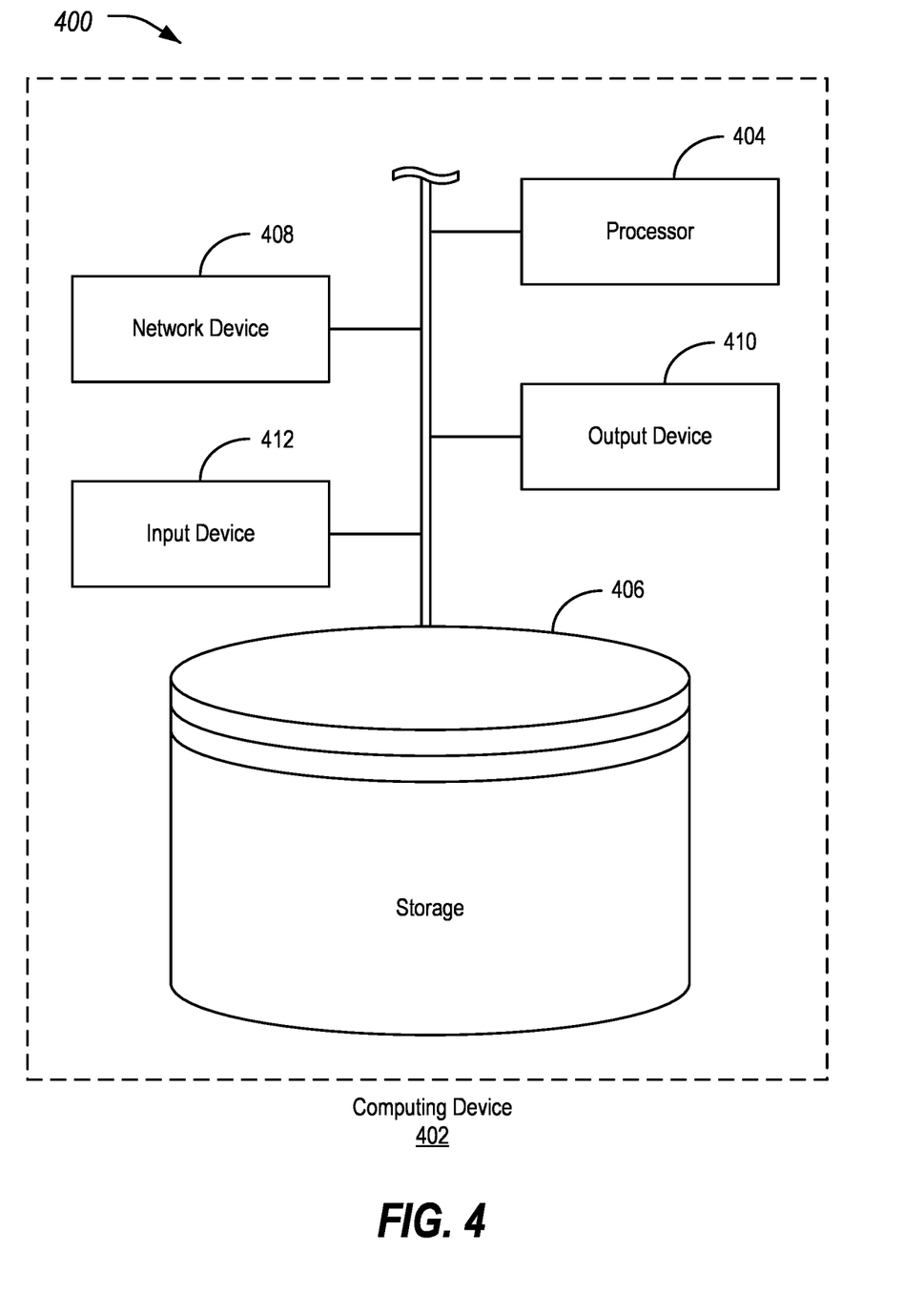
FIG. 4 illustrates an example of a computing device for performing channel-avoiding BLE phase measurement.

FIG. 4 illustrates an example 400 of a computing device 402 for performing channel-avoiding BLE phase measurement. Referring to FIG. 4, and with reference to FIGS. 1-3, the mobile device 104 and BLEM 110 may be examples of such computing devices 402. As shown, the computing device 402 includes a processor 404 that is operatively connected to a storage 406, a network device 408, an output device 410, and an input device 412. It should be noted that this is merely an example, and computing devices 402 with more, fewer, or different components may be used.

The processor 404 may include one or more integrated circuits that implement the functionality of a central processing unit (CPU) and/or graphics processing unit (GPU). In some examples, the processors 404 are a system on a chip (SoC) that integrates the functionality of the CPU and GPU. The SoC may optionally include other components such as, for example, the storage 406 and the network device 408 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 404 executes stored program instructions that are retrieved from the storage 406. The stored program instructions, accordingly, include software that controls the operation of the processors 404 to perform the operations described herein. The storage 406 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 410. The output device 410 may include a graphical or visual display device, such as an electronic display screen, projector, printer, or any other suitable device that reproduces a graphical display. As another example, the output device 410 may include an audio device, such as a loudspeaker or headphone. As yet a further example, the output device 410 may include a tactile device, such as a mechanically raisable device that may, in an example, be configured to display braille or another physical output that may be touched to provide information to a user.

The input device 412 may include any of various devices that enable the computing device 402 to receive control input from users. Examples of suitable input devices that receive human interface inputs may include keyboards, mice, trackballs, touchscreens, voice input devices, graphics tablets, and the like.

The network devices 408 may each include any of various devices that enable the vehicles 102 and cloud server 124 to send and/or receive data from external devices over networks. Examples of suitable network devices 408 include an Ethernet interface, a Wi-Fi transceiver, a cellular transceiver, or a BLUETOOTH or BLUETOOTH Low Energy (BLE) transceiver, UWB transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for interference-avoiding distance measurement comprising:
   a controller of a first wireless device, configured for wireless communication over a first transmission protocol with a second wireless device, programmed to:
      identify one or more occupied channels of a second transmission protocol, the first and second transmission protocols having overlapping frequency spectrums;
      construct a channel plan using a set of channels of the first transmission protocol that do not overlap in frequency with the one or more occupied channels of the second transmission protocol;
   perform phase-based ranging using data scanned via the channel plan; and
   indicate a distance measurement based on the phase-based ranging.

2. The system of claim 1, wherein the controller of the first wireless device is further programmed to:
   scan channels of the first transmission protocol to identify channels of the first transmission protocol which are suffering interference; and
   identify the one or more occupied channels of the second transmission protocol according to the identified channels of the first transmission protocol.

3. The system of claim 2, wherein the controller of the first wireless device is further programmed to identify the channels of the first transmission protocol suffering the interference by determining that in-phase and quadrature data cannot be extracted from the channels suffering the interference.

4. The system of claim 1, wherein the controller of the first wireless device is further programmed to identify the one or more occupied channels of the second transmission protocol using a receiver configured for operation according to the second transmission protocol.

5. The system of claim 1, wherein the controller of the first wireless device is further programmed to construct the channel plan according to an accuracy preference that specifies a predefined quantity of the channels of the first transmission protocol to be used to perform the phase-based ranging.

6. The system of claim 5, wherein the predefined quantity of the channels of the accuracy preference exceeds the predefined quantity of the channels of the first transmission protocol that do not overlap in frequency, such that the channel plan specifies repeated use of a subset of the channels of the first transmission protocol to perform the phase-based ranging.

7. The system of claim 1, wherein the first wireless device is a vehicle, and the second wireless device is a mobile device.

8. The system of claim 1, wherein the first transmission protocol is BLUETOOTH Low Energy (BLE), and the second transmission protocol is Wi-Fi.

9. A method for interference-avoiding distance measurement comprising:
   identifying, by a controller of a first wireless device configured for wireless communication over a first transmission protocol with a second wireless device, one or more occupied channels of a second transmission protocol, the first and second transmission protocols having overlapping frequency spectrums;
   constructing a channel plan using a set of channels of the first transmission protocol that do not overlap in frequency with the one or more occupied channels of the second transmission protocol;
   performing phase-based ranging using data scanned via the channel plan; and
   indicating a distance measurement based on the phase-based ranging.

10. The method of claim 9, further comprising:
    scanning channels of the first transmission protocol to identify channels of the first transmission protocol which are suffering interference; and
    identifying the one or more occupied channels of the second transmission protocol according to the identified channels of the first transmission protocol.

11. The method of claim 10, further comprising identifying the channels of the first transmission protocol suffering the interference by determining that in-phase and quadrature data cannot be extracted from the channels suffering the interference.

12. The method of claim 9, further comprising identifying the one or more occupied channels of a second transmission protocol using a receiver configured for operation according to the second transmission protocol.

13. The method of claim 9, further comprising constructing the channel plan utilizing an accuracy preference that specifies a predefined quantity of the channels of the first transmission protocol to be used to perform the phase-based ranging.

14. The method of claim 13, wherein the predefined quantity of the channels exceeds the predefined quantity of the channels of the first transmission protocol that do not overlap in frequency, such that a subset of the channels of the first transmission protocol that do not overlap in frequency are used multiple times to perform the phase-based ranging.

15. A non-transitory medium comprising instructions for interference-avoiding distance measurement that, when executed by a processor of a controller, cause the controller to:
    identify, by a controller of a first wireless device configured for wireless communication over a first transmission protocol with a second wireless device, one or more occupied channels of a second transmission protocol, the first and second transmission protocols having overlapping frequency spectrums;
    construct a channel plan using a set of channels of the first transmission protocol that do not overlap in frequency with the one or more occupied channels of the second transmission protocol;
    perform phase-based ranging using data scanned via the channel plan; and
    indicate a distance measurement based on the phase-based ranging.

16. The medium of claim 15, further comprising instructions that, when executed by the processor of the controller, cause the controller to:

scan channels of the first transmission protocol to identify channels of the first transmission protocol which are suffering interference; and identify the one or more occupied channels of the second transmission protocol according to the identified channels of the first transmission protocol.

17. The medium of claim 16, further comprising instructions that, when executed by the processor of the controller, cause the controller to identify the channels of the first transmission protocol suffering the interference by determining that in-phase and quadrature data cannot be extracted from the channels suffering the interference.

18. The medium of claim 15, further comprising instructions that, when executed by the processor of the controller, cause the controller to identify the one or more occupied channels of a second transmission protocol using a receiver configured for operation according to the second transmission protocol.

19. The medium of claim 15, further comprising instructions that, when executed by the processor of the controller, cause the controller to construct the channel plan utilizing an accuracy preference that specifies a predefined quantity of the channels of the first transmission protocol to be used to perform the phase-based ranging.

20. The medium of claim 19, wherein the predefined quantity of the channels exceeds the predefined quantity of the channels of the first transmission protocol that do not overlap in frequency, such that a subset of the channels of the first transmission protocol that do not overlap in frequency are used multiple times to perform the phase-based ranging.

* * * * *